D. MINICH.
Milk-Cans.

No. 151,709. Patented June 9, 1874.

Witnesses
Eugene V. Cadman
J. B. Connolly

Inventor
Daniel Minich
By Connolly Bros,
Attorneys.

UNITED STATES PATENT OFFICE.

DANIEL MINICH, OF PHILADELPHIA, PENNSYLVANIA.

IMPROVEMENT IN MILK-CANS.

Specification forming part of Letters Patent No. 151,709, dated June 9, 1874; application filed April 10, 1874.

*To all whom it may concern:*

Be it known that I, DANIEL MINICH, of Philadelphia, in the county of Philadelphia and State of Pennsylvania, have invented a certain new and useful Milk Can, Cooler, Preserver, and Detecter; and I do hereby declare the following to be a full, clear, and exact description of the invention, such as will enable others skilled in the art to which it pertains to make and use it, reference being had to the accompanying drawings, which form part of this specification, in which—

Figure 1:
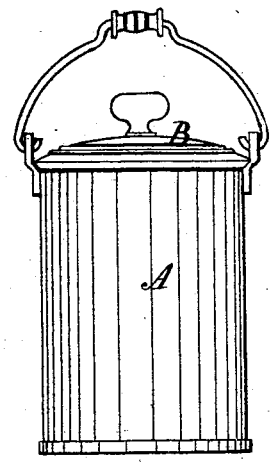
Figure 2:
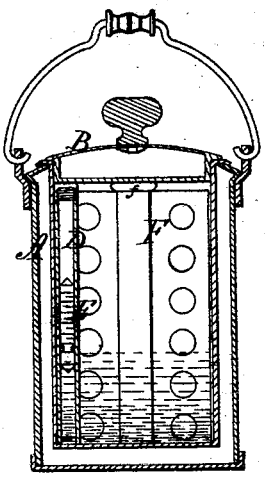
Figure 3:
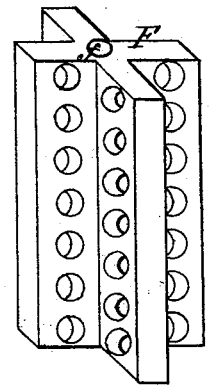
Figure 4:
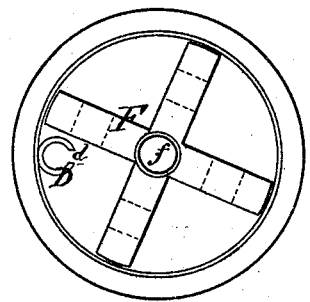
Figure 5:
Figure 6:
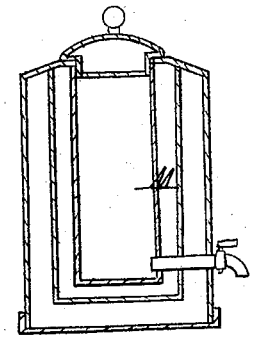

Figure 1 is a side elevation of my improved can. Fig. 2 is a vertical central section through the same. Fig. 3 is a perspective view of chemical-holder. Fig. 4 is a plan view of can with lid removed. Fig. 5 is a side view of gage. Fig. 6 is a vertical central section of a cooler.

My invention has for its object to provide a can for cooling and preserving milk, and for detecting any adulterations in the fluid, whether by the addition of water or otherwise. My invention consists of a can formed with double walls, lined or filled with a cooling or non-conducting substance. Within the can is a gage for detecting the dilution of milk, where water is added, and a close vessel for holding chemicals to effect the preservation of the freshness of the lacteal fluid, said chemicals serving also to indicate the presence of poisonous matter in the milk.

Referring to the accompanying drawing, A shows a can, which may be of any suitable shape, size, and proportions. B is the lid of the can, and both body and lid are formed with double walls filled with a non-conducting substance, as a mixture of salt and saltpeter. D shows a tube fastened to the inner wall of the can, and having a longitudinal slot, $d$. E is a gage or weighted piston located in said tube, and sliding up and down therein. $e$ $e^1$, &c., are lines marked thereon.

Milk having greater buoyancy than water, the gage E will be sustained thereby, showing the line $e$ above the surface, or even therewith. If a small quantity of water be added to the milk, the gage will sink to the line $e^1$. If water continues to be added, the gage will sink until the upper line $e^6$ becomes submerged. By graduating the lines $e$ $e^1$, &c., the proportion of water added to the milk may be readily detected.

F shows a vessel for holding chemicals designed to preserve the freshness of the milk. This vessel may be of any suitable shape; but it may, with advantage, be so constructed as to ramify the body of milk in various directions so as to bring every part of the fluid as nearly in contact as possible with the metal of the chemical-holder. The chemicals used are introduced through an opening, $f$, in the top of the holder, which is then securely sealed.

The milk is first poured into the can, and the chemical-holder, duly charged, placed therein. The lid is then placed upon the can, and it is found that the milk will be preserved in its purity and freshness for a great length of time.

This can may also be employed merely as a cooler without using the chemical-holder; or as a transportation-can.

If desired, the chemicals, instead of being placed in a centrally-located holder, may occupy a chamber between the milk-chamber and the double wall, and will thus surround the fluid they are designed to preserve.

What I claim as my invention is—

1. In combination with a milk-can, A, having a slotted tube, D, a floating gage for detecting the presence and proportions of water, substantially as shown and described.

2. In combination with a milk-can, A, a chemical-holder, F, substantially as shown, and for the purpose set forth.

In testimony that I claim the foregoing I have hereunto set my hand this 2d day of April, 1874.

DANIEL MINICH.

Witnesses:
JNO. A. BELL,
M. DANL. CONNOLLY.